US010859976B2

United States Patent
Lin et al.

(10) Patent No.: US 10,859,976 B2
(45) Date of Patent: Dec. 8, 2020

(54) DEVICE, A SYSTEM AND A METHOD IN HOLOGRAPHIC IMAGING

(71) Applicant: IMEC VZW, Leuven (BE)

(72) Inventors: Ziduo Lin, Leuven (BE); Richard Stahl, Leuven (BE); Abdulkadir Yurt, Leuven (BE)

(73) Assignee: IMEC VZW, Leuven (BE)

( * ) Notice: Subject to any disclaimer, the term of this patent is extended or adjusted under 35 U.S.C. 154(b) by 172 days.

(21) Appl. No.: 15/936,489

(22) Filed: Mar. 27, 2018

(65) Prior Publication Data
US 2018/0275604 A1 Sep. 27, 2018

(30) Foreign Application Priority Data

Mar. 27, 2017 (EP) ..................................... 17162976

(51) Int. Cl.
*G03H 1/02* (2006.01)
*G02B 27/09* (2006.01)
(Continued)

(52) U.S. Cl.
CPC ........... *G03H 1/02* (2013.01); *G02B 27/0977* (2013.01); *G02B 30/00* (2020.01); *G03H 1/0443* (2013.01); *G03H 1/0465* (2013.01); *G03H 1/0244* (2013.01); *G03H 2001/0212* (2013.01); *G03H 2001/045* (2013.01); *G03H 2001/0447* (2013.01); *G03H 2001/0454* (2013.01);
(Continued)

(58) Field of Classification Search
CPC ...... G03H 1/02; G03H 1/0443; G03H 1/0465; G03H 1/0244; G03H 2001/0212; G03H 2001/0447; G03H 2001/045; G03H 2001/0454; G03H 2001/2655; G03H 2001/266; G03H 2222/13; G03H 2222/34; G03H 2222/35; G03H 2223/23; G03H 2226/11; G02B 27/0977; G02B 27/22
USPC ......................................................... 359/15
See application file for complete search history.

(56) References Cited

U.S. PATENT DOCUMENTS

| 2012/0248292 A1 * | 10/2012 | Ozcan .................. G03H 1/0443 250/208.1 |
| 2013/0208273 A1 * | 8/2013 | Dominguez-Caballero ................ G01J 3/0216 356/311 |

(Continued)

FOREIGN PATENT DOCUMENTS

WO WO-2015082476 A1 6/2015

OTHER PUBLICATIONS

Denis et al., "Twin-Image Noise Reduction by Phase Retrieval in In-Line Digital Holography", HAL, Jun. 3, 2008.
(Continued)

*Primary Examiner* — Collin X Beatty
(74) *Attorney, Agent, or Firm* — Moser Taboada (57) ABSTRACT

A device in holographic imaging comprises: at least two light sources, wherein each of the at least two light sources is arranged to output light of a unique wavelength; and at least one holographic optical element, wherein the at least two light sources and the at least one holographic optical element are arranged in relation to each other such that light from the at least two light sources incident on the at least one holographic optical element interacts with the at least one holographic optical element to form wavefronts of similar shape for light from the different light sources.

20 Claims, 5 Drawing Sheets

(51) Int. Cl.
*G03H 1/04* (2006.01)
*G02B 30/00* (2020.01)
*G03H 1/26* (2006.01)

(52) U.S. Cl.
CPC .......... *G03H 2001/266* (2013.01); *G03H 2001/2655* (2013.01); *G03H 2222/13* (2013.01); *G03H 2222/34* (2013.01); *G03H 2222/35* (2013.01); *G03H 2223/23* (2013.01); *G03H 2226/11* (2013.01)

(56) References Cited

U.S. PATENT DOCUMENTS

| | | | |
|---|---|---|---|
| 2013/0280752 A1* | 10/2013 | Ozcan | G01B 9/02047 435/29 |
| 2015/0077819 A1* | 3/2015 | Schnell | G03H 1/0443 359/9 |
| 2015/0378080 A1* | 12/2015 | Georgiou | G02B 5/32 349/62 |
| 2017/0031144 A1 | 2/2017 | Rostykus et al. | |
| 2017/0052384 A1* | 2/2017 | Santori | G03H 1/0443 |
| 2017/0168285 A1* | 6/2017 | Ozcan | G03H 1/0443 |
| 2018/0033128 A1* | 2/2018 | Sobieranski | G03H 1/265 |
| 2018/0052425 A1* | 2/2018 | Ozcan | G01B 9/021 |
| 2019/0011882 A1* | 1/2019 | Gusyatin | G02B 21/365 |
| 2019/0162520 A1* | 5/2019 | Shaked | G01B 9/02047 |
| 2019/0286053 A1* | 9/2019 | Ozcan | H04N 5/23232 |

OTHER PUBLICATIONS

Rostykus et al., "Flat Lensless Phase Imager", Imaging and Applied Optics, 2016.
Rostykus et al., "Compact Lensless Phase Imager", Optics Express, vol. 25, No. 4, pp. 4438-4445, Feb. 20, 2017.

* cited by examiner

DEVICE, A SYSTEM AND A METHOD IN HOLOGRAPHIC IMAGING

CROSS-REFERENCE TO RELATED APPLICATIONS

This application claims priority to and the benefit of European Patent Application No. 17162976.9, filed on Mar. 27, 2017, the disclosure of which is incorporated herein by reference in its entirety.

TECHNICAL FIELD

The present invention relates to holographic imaging and in particular to a device, a system and a method for using multi-wavelength light sources.

BACKGROUND

Holography is a method of producing three-dimensional images of an object. Digital holography uses digital image sensors, such as a charge-coupled device (CCD) or a complementary metal-oxide-semiconductor (CMOS) image sensor.

In in-line digital holography, a light beam providing uniform illumination of an object is used for creating an interference pattern based on object light, being scattered by the object, and reference light of the light beam passing unaffected through the object. The interference pattern may be acquired by the digital image sensor and then, the acquired interference pattern may be reconstructed in order to determine an image of the object. In-line digital holography may typically be useful in microscopy applications, wherein a sample which is mostly transparent may be imaged. Thus, a large amount of light is unaffected by the object so that an interference pattern may be formed.

In-line holography may be performed with a simple set-up and with minimal optical hardware requirements. However, when the interference pattern is to be reconstructed into an optical image of the object, a so-called twin-image problem may occur.

The twin-image problem is rooted in electromagnetic nature of light. The hologram reconstruction involves solving a complex wave equation in order to back-propagate electromagnetic waves from the acquired interference pattern to an object plane. However, the acquired interference pattern may only include information on intensity of light and hence phase information is not acquired. The loss of the phase information leads to two indistinguishable solutions in the wave equation, i.e. the twin-image problem.

This implies that the reconstructed optical image of the object may comprise two overlaid images, one in focus and another out of focus, which leads to a degradation of image quality of the in-line holography.

In Denis et al, "Twin-image noise reduction by phase retrieval in in-line digital holography", Wavelets XI, SPIE's Symposium on Optical Science and Technology, Proceedings of SPIE, Volume 5914, pp. 59140J, 2005, different methods to address the twin-image problem are discussed. An approach is to use at least two holograms and perform hologram reconstruction in an iterative fashion to retrieve the phase information that is lost when the interference pattern is acquired.

Acquiring of multiple holograms may e.g. require a complex set-up in order for a holographic system to handle multiple light beams. It would be desired to provide a simple and compact set-up for acquiring of multiple holograms that may remove the twin-image problem.

In Rostykus et al, "Compact lensless phase imager", Optics Express, Vol. 25, No. 4, pp. 4438-4445, 2017, several hologram gratings are recorded on a photopolymer film arranged on a side of a prism. An array of single mode VCSELs can be arranged to provide several different illumination directions, which may be coupled by the hologram gratings towards a sample, such that multiple holograms may be recorded. Then, the multiple holograms may be used for retrieving phase information. Although, the array of VCSELs and the prism with the hologram gratings provide a relatively compact set-up, the creation of the hologram gratings is quite complex. Also, the use of a prism implies that while the set-up may be compact in a horizontal direction, i.e. along a direction of light output from VCSELs towards the prism, the set-up is not very compact in a vertical direction.

SUMMARY

An objective of the present inventive concept is to provide improved in-line holographic imaging. It is a particular objective of the present inventive concept to provide in-line holographic imaging using multiple light sources which may handle the twin-image problem in a robust manner with a compact set-up.

These and other objectives of the present inventive concept are at least partially met by the invention as defined in the independent claims. Preferred embodiments are set out in the dependent claims.

According to a first aspect, there is provided a device in holographic imaging, said device comprising: at least two light sources, wherein each of the at least two light sources is arranged to output light of a unique wavelength; and at least one holographic optical element, wherein the at least two light sources and the at least one holographic optical element are arranged in relation to each other such that light from the at least two light sources incident on the at least one holographic optical element interacts with the at least one holographic optical element to form wavefronts of similar shape for light from the different light sources.

By means of providing at least two light sources, the two light sources may illuminate an object such that there is a phase diversity between the light sources. This phase diversity may then be used in aiding reconstruction of an optical image of the object so as to avoid or alleviate the twin-image problem.

The device is thus particularly suitable for use in holographic imaging. The device may provide illumination that may be advantageously used in holographic imaging of an object. In other words, the device may be suitable for holographic projection.

In particular, thanks to each of the at least two light sources being arranged to output a unique wavelength, a phase diversity is provided based on the different wavelengths used by the different light sources. Further, the at least one holographic element may be arranged to illuminate an object using similar or common illumination direction, which implies that multiple interference patterns acquired based on the illumination light from the different light sources may be acquired in same positions on an image sensor. Thus, the different interference patterns may be easily used in combination when reconstructing an image of the object. For instance, there may be no need of registering images of different interference patterns before the images may be used in combination in reconstructing an image of the object.

The at least one holographic optical element is arranged to form wavefronts of similar shape for light from the different light sources. This implies that light originating from different light sources and having interacted with the at least one holographic optical element may be directed towards an object in a similar manner. For instance, optical axes associated with light beams output from the at least one holographic element may be overlapping, wherein the light beams are based on light originating from the different light sources.

The light beams may be focused towards one or more common spots, wherein the object may be placed in a plane coinciding with focus points of the light beams. For instance, the at least one holographic optical element may output a highly focused, highly uniform single spot based on a plurality of incident light beams. According to an alternative, the at least one holographic optical element may form a planar collimated wavefront, which may have a large area to enable illuminating a large area on the object.

As used herein, the wavefronts having "similar shape" should be construed as the wavefronts being sufficiently similar that interference patterns acquired based on light originating from different light sources may be overlapping in an image sensor. This implies that the interference patterns should not be spatially shifted in relation to each other more than a size of a light-detecting element of the image sensor. Thus, there is no need of an extra step of registering interference patterns acquired by an image sensor in relation to each other before an image may be reconstructed based on the multiple interference patterns.

The wavefronts may have identical shape, which would imply that the interference patterns are exactly overlapping.

It should be realized that complex wavefronts may be formed based on the at least one holographic optical element. The device may be designed such that the wavefronts formed by the at least one holographic optical elements are adapted to the analysis desired to be made by the device.

Thanks to the light from the light sources interacting with at least one holographic optical element, the device may be designed with a relatively free placing of the light sources in relation to each other. The holographic optical element may be adapted to output appropriate light based on chosen placement of the light sources. Thus, the light sources may for instance be arranged in positions which fit an overall size and shape of the device. This implies that there is a large degree of freedom in designing the device.

It is an insight of the invention that using at least one holographic optical element, a desired illumination of an object may be based on at least two light sources that need not necessarily be arranged very close to each other. Knowing the desired wavefront to be output by the at least one holographic optical element and a desired placement of the light sources, characteristics of the at least one holographic optical element may be digitally calculated and, then, the at least one holographic optical element may be manufactured based on the calculated characteristics.

According to an embodiment, a single holographic optical element is used for outputting light based on light beams from the at least two light sources. This implies that there is no need of controlling a relation between a plurality of holographic optical elements and there is only a need of accurately arranging a single holographic optical element in the device in order to achieve the desired illumination output from the holographic optical element.

However, it should be realized that desired illumination of an object based on light from the at least two light sources may be formed using more than one holographic optical element. For instance, two or more holographic optical elements may be arranged in sequence in an optical path of light, such that light from the at least two light sources first interacts with a first holographic optical element and is directed towards and interacts with a second holographic optical element. The last holographic optical element in such a sequence may then output the desired illumination towards the object.

Alternatively, the light beam from a first light source may be incident on a first holographic optical element, whereas the light beam from a second light source may be incident on a second holographic optical element. The first holographic optical element may form a first light beam which is incident on a common holographic optical element, whereas the second holographic optical element may form a second light beam which is also incident on the common holographic optical elements. The first and second holographic optical elements may for instance function to increase a numerical aperture of the beams originating from the light sources, such that the light beams may be incident on a large (or entire) portion of the common holographic optical element. In such case, the first and second holographic optical elements may be arranged very close to and/or at a large angle in relation to the common holographic optical element, while allowing the light beam to be incident on a large portion of the common holographic optical element. This implies that a very compact system may be formed.

It should also be realized that the light beam originating from a light source may interact with one or more holographic optical elements before being incident on the common holographic optical elements. Also, the light beams from different light sources may interact with different number of holographic optical elements before being incident on the common holographic optical element. For instance, a first light beam from a first light source may interact with one holographic optical element before being incident on the common holographic optical element, whereas a second light beam from a second light source may be directly incident on the common holographic optical element without interacting with any other holographic optical element.

In an embodiment, different sides of a substrate may be used for providing a plurality of holographic optical elements. Thus, light beams from two or more light sources may be incident on different portions of a first side of a substrate, wherein the different portions may be arranged to direct light from the light sources to be incident on a common holographic optical element on another side of the substrate. The common holographic optical element may then transmit incoming light to form wavefronts of similar shape for light from the different light sources.

Each of the at least two light sources may be arranged to illuminate the object with a spatially coherent light beam. This implies that a correlation or predictable relationship between waves at different points in space exists, such that object light may cause an interference pattern with reference light spatially close to a point in which e.g. diffraction by the object occurs. The spatially coherent light beam may be formed e.g. by a laser source or by an incoherent light beam, e.g. emitted by a light-emitting diode (LED) which is passed through a narrow spatial filter, such as a pinhole.

The illumination may be performed sequentially by the at least two light sources such that a first interference pattern may be first acquired during illumination by a first light source and a second interference pattern may be subsequently acquired during illumination by a second light source. According to an alternative, illumination may be performed simultaneously by the at least two light sources. An image sensor may then be associated with filters in order to enable acquiring of multiple interference patterns based on the light from the different light sources.

According to an embodiment, the at least one holographic optical element reflects incident light towards an object and the light sources and the object are arranged at the same side of the at least one holographic optical element.

The device may thus reflect the incident light towards an object arranged at the same side of the at least one holographic optical element. This implies that the light sources and the object may be precisely placed with respect to the holographic optical element such that the wavefronts of the similar shape formed from incidence of the light sources on the holographic optical element are reflected onto the object for holographic imaging of the object.

This also allows a very compact set-up of the device, as the object may be arranged on the same side as the light sources and the device may provide an overlap between a distance between the light sources and the holographic optical element and a distance between the holographic optical element and the object.

According to an embodiment, the at least one holographic optical element transmits incident light towards an object and the light sources and the object are arranged at opposite sides of the holographic optical element.

The device may thus transmit the incident light towards an object arranged at an opposite side of the holographic optical element in relation to the light sources. This implies that the light sources and the object may be precisely placed with respect to the holographic optical element such that the wavefronts of the similar shape formed from incidence of the light sources on the holographic optical element are transmitted onto the object for holographic imaging of the object.

Arranging the at least one holographic optical element to transmit light from the light sources towards the object implies that design of the device may be simpler compared to the at least one holographic optical element reflecting light, as the object need not be arranged as close to the light sources.

According to an embodiment, the at least one holographic optical element comprises small diffractive elements positioned on a surface of the at least one holographic optical element such that the small diffractive elements form wavefronts of similar shape for the incident light from different light sources.

The at least one holographic optical element may comprise small diffractive elements on its surface wherein position of such small diffractive elements is precisely determined by an algorithm that may create a hologram with a complex optical function combining the position and wavefront properties of the light sources with the complex output wavefront that is supposed to be output by the at least one holographic optical element. Such algorithms have been developed that can calculate how the holographic optical element should be formed based on the input/output relations.

The small diffractive elements may have sizes smaller than a wavelength of the light from the light sources. For instance, a side of a square diffractive element may be smaller than the wavelength of light or a diameter of a circular diffractive element may be smaller than the wavelength of light. Such sub-wavelength diffractive elements may have light-attenuating or phase-modulating characteristics. Thus, a diffractive element may absorb some of an incoming photon and reduce light intensity in the position on the holographic optical element where the diffractive element is arranged, or the diffractive element may delay or change the phase of the light e.g. by the diffractive element having a higher refractive index than surrounding diffractive elements.

The at least one holographic optical element may then be formed by a collection of such diffractive elements arranged in a raster that selectively modulate the light to achieve given/necessary functions to for example collect light from the at least two light sources and output desired illumination towards the object.

According to an embodiment, the device comprises at least three light sources. The use of at least three light sources implies that phase diversity information may be acquired based on at least three different interference patterns. Adding a third interference pattern to two previously acquired interference patterns may substantially improve quality of the reconstructed image of the object. Thus, using at least three light sources, the twin-image problem may be handled in a robust manner.

Using three light sources may appropriately balance amount of needed calculations (and thus processing time/resources) and a quality of the reconstructed image of the object. Although more than three sources could be used, it may not be worth performing extra calculations as adding a fourth light source and a fourth interference pattern may only contribute to a small improvement in image quality. However, if processing requirements are not an issue and really high quality is desired, four or more light sources may be used.

According to an embodiment, the distance between the light sources and the at least one holographic optical element is shorter than a size of a surface of the at least one holographic optical element on which light from the light sources is incident. The distance between the light sources and the holographic optical element may thus be shorter than the size of one side of the surface or a diameter of the holographic optical element. This implies that a very compact device may be formed as the light sources may be arranged close to the holographic optical element.

If the light sources are arranged close to the holographic optical element, an angle between a propagation direction of a light beam from a light source and a normal to the surface of the holographic optical element may be relatively large (in order for the light beam to interact with a large are of the holographic optical element). A size of the diffractive elements of the holographic optical element may need to be smaller for a larger angle of the incident light. Thus, the more compact the device is made, stricter requirements may be set on the forming of the holographic optical element.

According to an embodiment, the device further comprises a housing, wherein the light sources and the at least one holographic optical element are mounted in the housing. The device may thus comprise a housing wherein the light sources and the holographic optical elements are arranged inside, such that a compact device may be provided. The light sources and the holographic optical element may have a well-controlled relation when mounted in the housing. This implies that the device may be manufactured in a controlled manner and may be delivered to a user with the light sources and the holographic optical element arranged in proper relationship to each other within the housing, such that the user may not need to set up the physical relations of the parts of the device in order to be able to start acquiring holographic images of objects using the device.

In an embodiment, the housing of the device further comprises a sample receiver for holding an object in a position to receive light having interacted with the at least one holographic optical element. This implies that a sample receiver for holding an object in a precise position may also be arranged inside the housing of the device, such that a compact device may be provided. Further, the device may ensure that an object is arranged in a well-defined position that fits the illumination output by the holographic optical element. Thus, a user may be guided to arrange the object in a proper position for acquiring a high quality holographic image of the object.

In an embodiment, the light sources are laser diodes. This implies that the device may comprise laser sources e.g. in form of laser diodes. The laser diodes may be arranged in a conventional package allowing the device to make use of a common manner of providing laser light sources, such that an inexpensive off-the-shelf product may be used. The use of such laser diodes may also provide a compact device. The laser sources may alternatively be provided as laser diode chips (without being arranged in a standard packaging). This may facilitate making the device even more compact, but may require careful handling of the laser sources before mounting in the device, as the laser sources may not be covered by a protective package.

Further, a laser source may inherently output spatially coherent light, which may be needed in illumination of the object in order to enable acquiring an interference pattern that may be used to reconstruct an image of the object. Thus, using a laser source, such as a laser diode, may provide desired light characteristics for illuminating an object.

According to a second aspect, there is provided a system for holographic imaging, said system comprising: a device according to the first aspect, wherein the light having interacted with the at least one holographic optical element is arranged to form illumination light for illuminating an object; and an image sensor comprising light-detecting elements arranged to detect interference patterns formed by object light, having interacted with the object, and reference light of the illumination light, wherein one interference pattern is formed for each unique wavelength of light. Such a system provides a device for providing illumination light as well as an image sensor for detecting interference patterns such that the system may enable acquiring of required information for forming a holographic image of an object. The illumination light provided in the system may be created by a compact device, such that also a compact system for holographic imaging may be provided.

Effects and features of this second aspect are largely analogous to those described above in connection with the first aspect. Embodiments mentioned in relation to the first aspect are largely compatible with the second aspect.

In an embodiment, the system further comprises a processor unit, which is arranged to receive the interference pattern from the image sensor and is arranged to reconstruct an optical image of the object based on the interference patterns. This implies that the system may also include a processor unit for reconstructing an optical image of the object based on information acquired by the system. The processor unit may be arranged in connection to the image sensor and the device according to the first aspect such that a compact system may be provided.

In an embodiment, the image sensor and the at least two light sources and the at least one holographic optical element are mounted in a common housing defining an optical pathway for light output from the at least one holographic optical element to the image sensor. This implies that the system may be packaged in a common housing including the image sensor, the light sources and the holographic optical elements. Thus, the system may be delivered with a well-defined relationship between the parts of the system such that high quality holographic images of objects may be formed using the system. A user may directly use the system, without need of setting up relationships between the parts of the system. Also, by means of the parts being mounted in a common housing, a compact system may be provided.

The processor unit may also be arranged in the common housing, such that a simple interface to the housing may be provided. The system may output simply a reconstructed image to an external unit which may be used directly e.g. for output on a display. The common housing may also have an integral display for presenting the reconstructed image of the object to a user.

This implies that the device may be manufactured in a controlled manner and may be delivered to a user with the light sources and the holographic optical element arranged in proper relationship to each other within the housing, such that the user may not need to set up the physical relations of the parts of the device in order to be able to start acquiring holographic images of objects using the device.

According to a third aspect, there is provided a method in holographic imaging, said method comprising: outputting light from at least two light sources, wherein each of the at least two light sources outputs light of a unique wavelength; receiving the light from the at least two light sources by at least one holographic optical element, and interacting with the received light by the at least one holographic optical element in order to output light forming wavefronts of similar shape for light originating from the different light sources.

Effects and features of this third aspect are largely analogous to those described above in connection with the first and second aspects. Embodiments mentioned in relation to the first and second aspects are largely compatible with the third aspect.

The method enables outputting light which may be used to illuminate an object such that there is a phase diversity between the information obtained using light originating from different light sources. This phase diversity may then be used in aiding reconstruction of an optical image of the object so as to avoid or alleviate the twin-image problem.

In particular, thanks to each of the at least two light sources outputting a unique wavelength, a phase diversity is provided based on the different wavelengths used by the different light sources. Further, the at least one holographic element may be arranged to illuminate an object using similar or common illumination direction, which implies that multiple interference patterns acquired based on the illumination light from the different light sources may be acquired in same positions on an image sensor. Thus, the different interference patterns may be easily used in combination when reconstructing an image of the object. For instance, there may be no need of registering images of different interference patterns before the images may be used in combination in reconstructing an image of the object.

According to an embodiment, the method further comprises illuminating an object using illumination light output from the at least one holographic optical element; detecting a first interference pattern formed by object light of a first wavelength, having interacted with the object, and reference light of the illumination light of the first wavelength; and detecting a second interference pattern formed by object light of a second wavelength, having interacted with the object, and reference light of the illumination light of the second wavelength. This implies that a first and a second interference pattern are detected, which may be used in combination to reconstruct an optical image of an object while avoiding the twin-image problem.

According to an embodiment, outputting light from at least two light sources comprises sequentially outputting light from a first light source to detect the first interference pattern and outputting light from a second light source to detect the second interference pattern.

By detecting the interference patterns sequentially, the image sensor may be arranged to detect each interference pattern with a high resolution (as the image sensor need not differentiate between the first and the second interference pattern).

Although the interference patterns may be acquired in a sequential manner, thanks to the use of different wavelengths by the different light sources it may be possible to simultaneously detect the first and the second interference patterns. For instance, the image sensor may comprise an intertwined layout of different wavelength filters on light-detecting elements such that a two-dimensional interference pattern may be acquired for each wavelength interval defined by the different wavelength filters. However, it should be realized that a resolution of the acquired interference patterns is reduced if several different wavelength filters are arranged on the image sensor. Thus, it may still be desired to use a sequential illumination while using different wavelengths of the light sources.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings. In the drawings like reference numerals will be used for like elements unless stated otherwise.

DETAILED DESCRIPTION

Detailed embodiments of the present invention will now be described with reference to the drawings.

Figure 1A:
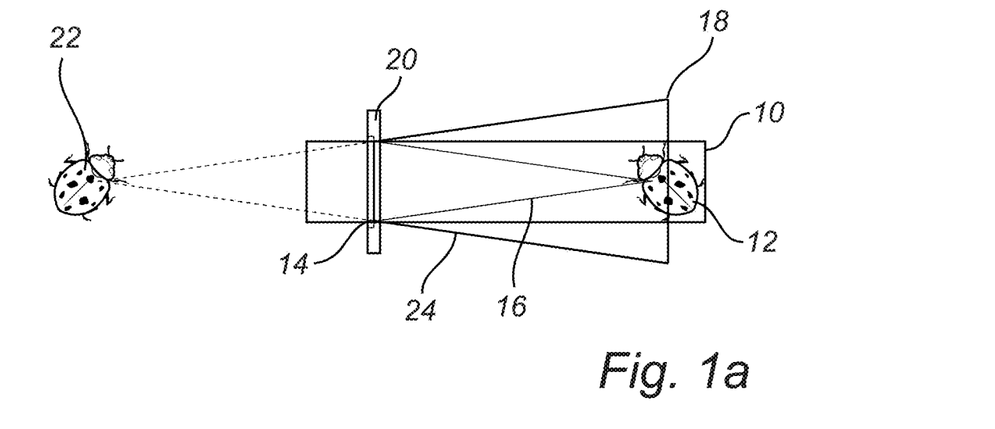
FIG. 1a is a schematic illustration of a twin-image problem in in-line holographic imaging.

The invention relates to in-line digital holographic imaging. As illustrated in FIG. 1a, in in-line holographic imaging, object light and reference light have a common optical axis and is formed from a common illumination beam 10. Thus, an object 12 is illuminated by the illumination beam 10 which is partly diffracted by the object 12 forming the object light and partly is unaffected by the object 12 forming the reference light. The object light and the reference light may thus form an interference pattern, which may be acquired by an image sensor 14. As illustrated by ray 16, the diffraction of object light is distributed onto the image sensor 14.

The image sensor 14 detects a two-dimensional distribution of light intensity as a representation of the interference pattern. An image of the object 12 may then be reconstructed by applying a complex wave equation to the detected interference pattern for forming a focused image in an object plane 18 from the detected light in an image plane 20 in which the image sensor 14 is arranged.

Figure 1B:
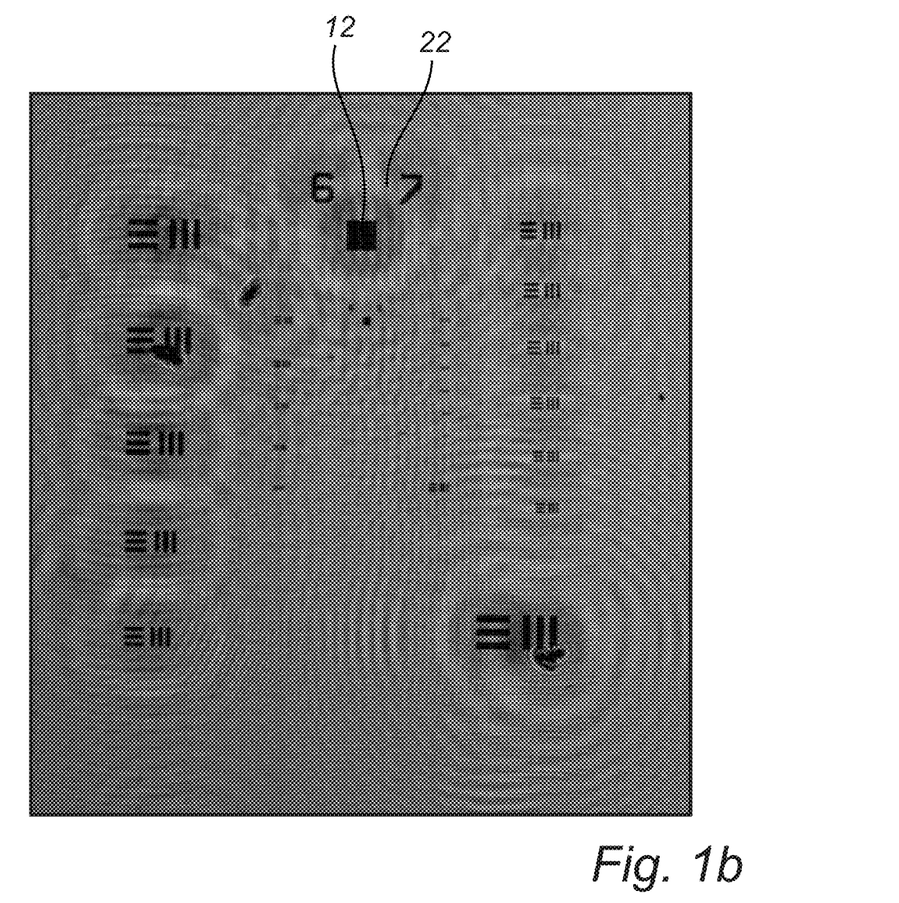
FIG. 1b is an example reconstructed image of an object illustrating the twin-image problem.

However, the detected light intensity does not comprise phase information and the detected interference pattern could also have been formed by a virtual twin-image 22 of the object 12. Thus, when the complex wave equation is solved for reconstructing the image of the object 12 by back-propagating the detected interference pattern in the image plane 20 to form the image of the object 12 in the object plane 18, a contribution of the virtual twin-image 22 cannot be removed. In the reconstructed image of the object 12, the twin-image 22 of the object will also be imaged, but the twin-image 22 will be out of focus in the object plane 18 as illustrated by ray 24. The twin-image 22 will thus affect quality of the reconstructed image. As illustrated in FIG. 1b, which is a reconstructed image of a test object, a defocused twin-image 22 appears as halos around sharp features forming the object 12.

Figure 2:
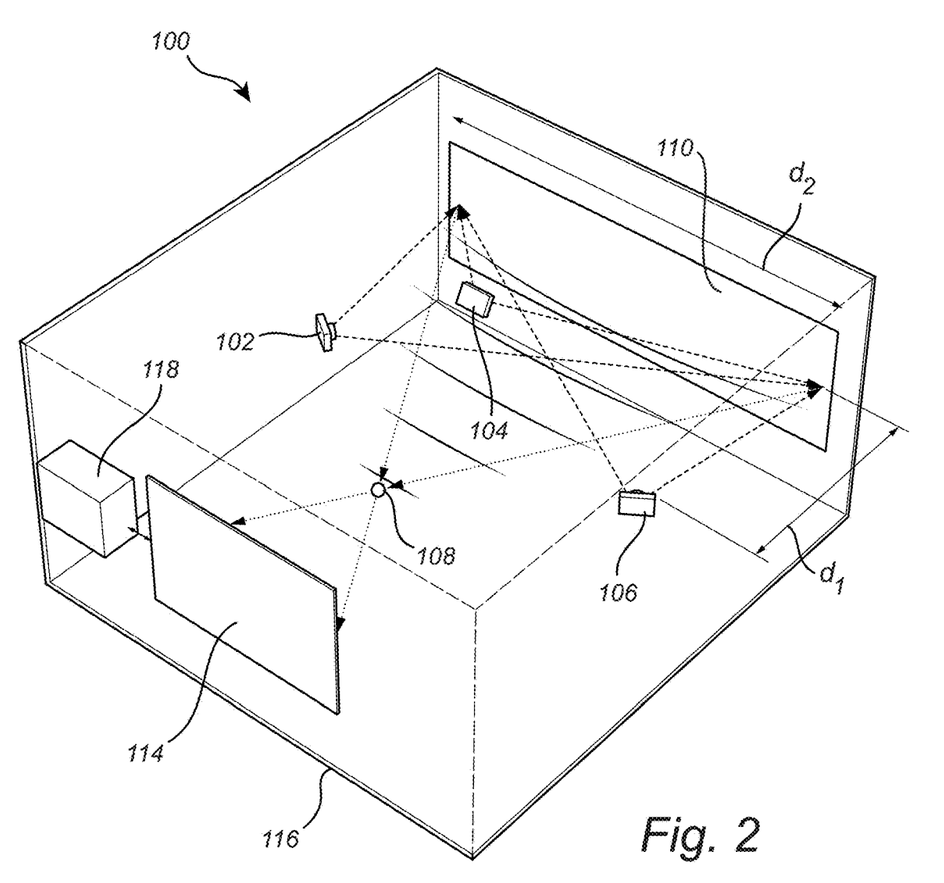
FIG. 2 is a schematic view of a system according to a first embodiment.

Referring to FIG. 2, a system 100 according to a first embodiment of the invention will be described. The system 100 is arranged to acquire image information using in-line holographic imaging in such a manner as to enable alleviating the twin-image problem through combining multiple light sources into a compact illumination system.

As illustrated in FIG. 2, the system 100 comprises three light sources 102, 104, 106. The system 100 may comprise more than three light sources such as four, five or even more light sources. However, using three light sources will considerably improve the image quality with respect to the twin-image problem, whereas using four light sources or more may not substantially improve image quality but may require performing more computations. It should also be realized that only two light sources may be used, but in such case, the twin-image problem could still be visible and may affect image quality.

Each of the light sources 102, 104, 106 is arranged to output light which may be used for illuminating an object 108. The light sources 102, 104, and 106 are arranged to output light of unique wavelengths, such that the output light wavelength differs between the light sources 102, 104, 106. This implies that interference patterns recorded based on the different illuminations provided by the different light sources 102, 104, 106 enables detecting of phase diversity information. The phase diversity information may then be used to reconstruct an image of an object while avoiding the twin-image problem.

The system 100 may comprise at least one holographic optical element. As shown in FIG. 2, the system 100 may comprise a single holographic optical element 110, which is arranged to receive light from the light sources 102, 104, 106 and output illumination light towards the object 108.

The holographic optical element 110 may comprise small diffractive elements on its surface and a position of the small diffractive elements may be precisely determined by an algorithm based on desired properties of input light towards the holographic optical element 110 and output illumination light. The small diffractive elements may form a hologram with a complex optical function combining the position and wavefront properties of the light sources 102, 104, 106 with the complex output wavefront that is supposed to be output by the holographic optical element 110.

The holographic optical element 110 comprising small diffractive elements may receive the light from the three light sources 102, 104, 106 and form wavefronts of similar shape for light from the different light sources. As shown in FIG. 2, the light from the different light sources 102, 104, 106 may be focused towards a common single spot in a plane in which the object 108 is arranged.

The holographic optical element 110 of FIG. 2 reflects the incident light towards the object 108. The light sources 102, 104, 106 and the object 108 are located at the same side of the holographic optical element 110, allowing the reflected beam to be focused on the object 108.

As described later, the holographic optical elements may alternatively transmit the incident light towards an object. In case of the transmission, the light sources and the object are located at opposite sides of the holographic optical element.

The system 100 may further comprise an image sensor 114, which comprises a set of light-detecting elements. The light-detecting elements may thus detect a light intensity incident on the respective light-detecting element and together the set of light-detecting elements may detect a distribution of light intensities in two dimensions in a plane defined by the image sensor 114. Thus, when the object 108 is illuminated by a light beam from at least one of the light sources 102, 104, 106, an interference pattern formed by diffracted light, being scattered by the object 108, and undiffracted light of the light beam may be acquired by the image sensor 114.

The image sensor 114 could comprise various types of arrays of light-detecting elements for detecting intensity of incident light. For instance, the image sensor 114 could comprise an array of charge-coupled device (CCD) pixels or an array of complementary metal-oxide-semiconductor (CMOS) pixels. The image sensor 114 could further comprise circuitry for reading out information on light intensities detected in the light-detecting elements and for performing analog-to-digital conversion for creating a digital representation of the interference pattern.

The distance between the light sources 102, 104, 106 and the holographic optical element 110 may be shorter than the size of a surface of the holographic optical element 110 where the size of the surface may be a size of one side of the surface or a diameter of the holographic optical element 110. Such small distance between the light sources 102, 104, 106 and the holographic optical element 110 implies that a device for providing illumination light comprising the light sources 102, 104, 106 and the holographic optical element 110, 112 may be of a small size, which results in a compact system 100.

As illustrated in FIG. 2, the distance d1 between a light source 102, 104, 106 may be a shortest distance along a direction parallel to a normal to the holographic optical element 110 from a plane of the surface of the holographic optical element 110 to the light source 102, 104, 106. As mentioned above, the size of a surface of the holographic optical element 110 may e.g. be a size of a side of the surface, as illustrated by d2 in FIG. 2. By arranging the system 100 such that d1<d2, a very compact system 100 may be achieved.

The system 100 may further comprise a common housing 116 in which the light sources 102, 104, 106, the holographic optical element 110 the image sensor 114 and the object 108 are mounted. The common housing 116 may provide mounting supports for the image sensor 114, the light sources 102, 104, 106 and the holographic optical element 110 to define relations among them in a well-controlled manner. The common housing 116 may further comprise a sample receiver for holding an object 108 in a position to receive light having interacted with the holographic optical element 110. The receiver could be movable between a measurement position in which the object is placed for measurement and a mounting position, extending at least partly outside the common housing 116 allowing a user to place the object 108 in the receiver. The receiver may be arranged to perform a simple movement, e.g. a pure rotation or translation, between the measurement position and the mounting position, such that a position of the object 108 is accurately defined in the housing 116. Alternatively, the receiver may be fixed and the common housing 116 may allow access to a user for placing an object 108 in the receiver.

It should be realized that the receiver may have any shape or form for supporting or receiving the object in the measurement position. In one embodiment, the object 108 may be arranged in a sample holder having standardized size and shape and the receiver may comprise a slot for receiving the sample holder in a pre-defined relation in the receiver. In another embodiment, the receiver may comprise one or more supporting structures on which the object 108 may be placed in the common housing 116.

The light sources 102, 104, 106 may be formed e.g. by laser diodes. The use of laser diodes allows the system 100 to make use of a common manner of providing laser light sources, such that an inexpensive off-the-shelf product in a conventional package may be used. The use of such laser diodes may also reduce the size of a system and provide a compact system 100.

The system 100 may also comprise a processor unit 118 which is arranged to receive the interference pattern from the image sensor 114 and to reconstruct an optical image of the object 108 based on the interference pattern. The processing unit 118 may also be provided in the form of an inexpensive off-the-shelf product in a conventional package which may also reduce the size of a system and provide a compact system 100.

The processor unit 118 may be implemented as software being executed on a general-purpose computer, as firmware arranged e.g. in an embedded system, or as a specifically designed processor unit, such as an Application-Specific Integrated Circuit (ASIC) or a Field-Programmable Gate Array (FPGA).

The processor unit 118 may utilize information of positions of the light sources 102, 104, 106 in relation to the object 108 and the image sensor 114 and information of wavelengths emitted by the light sources 102, 104, 106. Upon manufacture of the system 100, an initial calibration may be performed to determine exact positions and wavelengths so as to account for e.g. any imprecision in mounting. The calibration may thus be performed once and, since the relations of the light sources 102, 104, 106, the holographic optical elements 110, 112, the object 108, and the image sensor 114 are fixed in the common housing 116, the initial calibration applies to future holographic imaging performed with the system 100.

Calibration results may be stored as a file available to the processor unit 118 or may be integrated into a specially adapted reconstruction algorithm run by the processor unit 118.

The light sources 102, 104, 106 may simultaneously illuminate the object 108. It should be realized that the first, second, and third images may be simultaneously acquired by subsets of light-detecting elements of the image sensor, e.g. being sensitive to different wavelengths of each of the light sources.

Each light-detecting element of the image sensor 114 may thus be arranged to detect the wavelength emitted by one of the light sources 102, 104, 106, e.g. by having a corresponding filter arranged integrated on the light-detecting element. In a group of adjacent light-detecting elements within the image sensor 114, there may thus be one light-detecting element associated with each of the emitted wavelengths. Such a group may thus form a "macro-pixel" and the macro-pixels may be repeated on the image sensor 114 so as to allow acquiring two-dimensional images for each of the wavelengths. A resolution of each such image for a wavelength range will thus correspond to the number of macro-pixels on the image sensor 114.

If the interference patterns are to be acquired simultaneously, a resolution of the acquired interference patterns will hence be decreased. However, in certain applications, such impairment of acquiring of the interference pattern may be acceptable. Further, if the object 108 is moving or changing, this may at best cause blur in reconstruction of an image of the object based on sequential illumination. Thus, for a moving object 108, simultaneous illumination with different wavelengths may be desired.

The light sources 102, 104, and 106 may alternatively sequentially illuminate the object 108 by first illuminating the object 108 based on the light beam emitted by the first light source 102 and subsequently illuminating the object 108 based on the light beams emitted by the second light source 104 and the third light source 106, respectively. In such case, all light-detecting elements of the image sensor 114 may contribute to detecting each interference pattern, which implies that the interference patterns may be detected with a high resolution.

Figure 3:
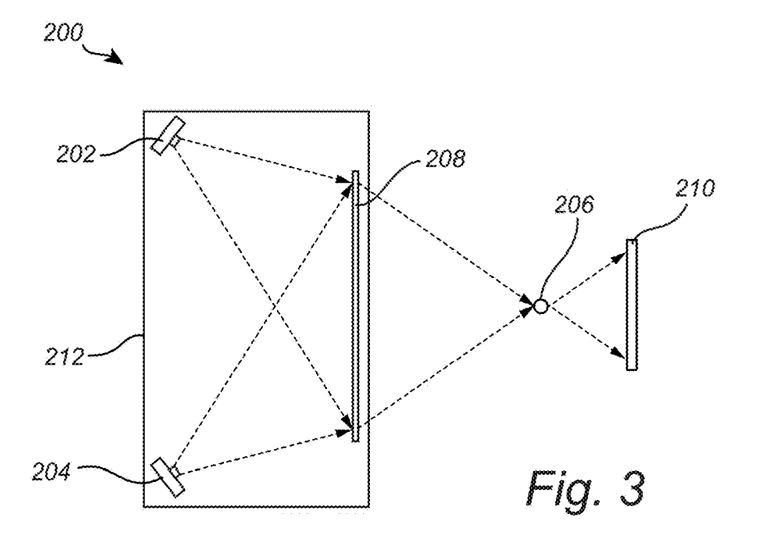
FIG. 3 is a schematic view of a system according to a second embodiment.

Referring to FIG. 3, a system 200 according to a second embodiment of the invention will be described. In the following, differences of the system 200 according to the second embodiment in relation to the system 100 according to the first embodiment are mainly discussed. As appreciated by a person skilled in the art, the system 200 of the second embodiment may utilize many of the features discussed above in relation to the first embodiment of the system 100.

The system 200 comprises two light sources 202, 204 and a holographic optical element 208 mounted in a housing 212. Parts of the system 200 which contribute to outputting of illumination light for illuminating an object 206 may thus be arranged in a common housing 212. The housing 212 with the mounted light sources 202, 204 and the holographic optical element 208 may thus form a device for providing holographic projection in a holographic imaging system 200.

It should be realized that the light sources and the reflective holographic optical element in the first embodiment may also be arranged in a separate housing wherein light may be output from the housing towards the object 108.

The light sources 202, 204 may be the same as light sources 102, 104, 106 of the system 100. The system 200 may also comprise more than two light sources, as discussed above in relation to the system 100 of the first embodiment, and/or more than one holographic optical element 208, as discussed below.

The holographic optical element 208 is arranged to transmit the incident light from the light sources 202, 204 towards the object 206. Thus, the holographic optical element 208 may receive light from the light sources 202, 204 and interact with the incident light to output light with a desired wavefront, wherein the light passes through the holographic optical element 208.

The object 206 and the image sensor 210 may be arranged outside of the housing 212, but could also be arranged inside a common housing of the system 200. The housing 212 may have an orifice to output the light from the holographic optical element 208 towards the object 206. The housing 212 may alternatively have a transparent area for outputting light from the housing 212 while providing a cover to protect parts of the system 200 mounted in the housing 212.

The holographic optical element 208 may transmit light incident on a first surface of the holographic optical element 208 and output light through a second surface of the holographic optical element 208. The holographic optical element 208 may be arranged to form illumination light based on light beams from the light sources 202, 204. Thus, the object 206 may be illuminated using different wavelengths of light such that interference patterns detected during the different illuminations provides phase diversity information.

Figure 4:
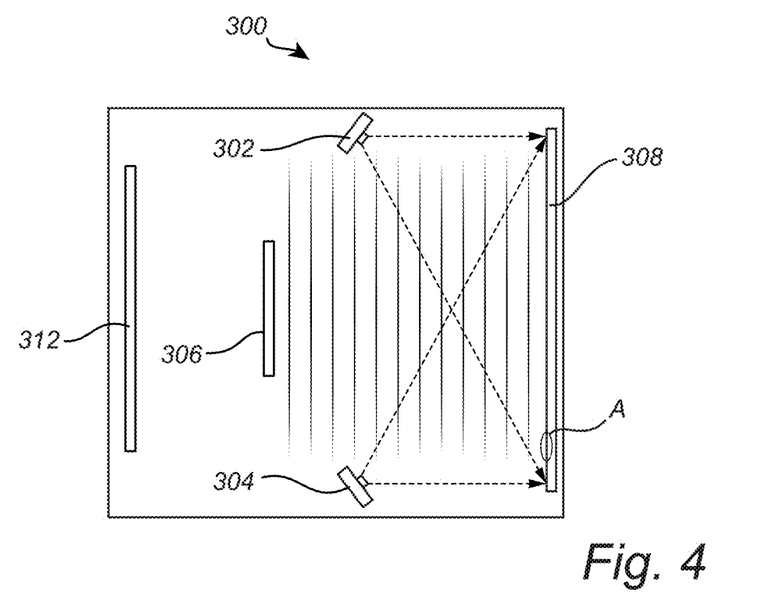
FIG. 4 is a schematic view of a system according to a third embodiment.

Referring to FIG. 4, a system 300 according to a third embodiment of the invention will be described. In the following, differences of the system 300 according to the third embodiment in relation to the systems 100, 200 according to the first and second embodiments are mainly discussed. As appreciated by a person skilled in the art, the system 300 of the third embodiment may utilize many of the features discussed above in relation to the first and second embodiments of the system 100, 200.

The system 300 comprises two light sources 302, 304 and a holographic optical element 308. The system 300 in FIG. 4 illustrates that the holographic optical element 308 may be arranged to output a collimated beam based on incident light beams from the light sources 302, 304. Thus, a large area planar wavefront may be provided from the holographic optical element 308, which may be used for illuminating a large object 306 and allow simultaneous imaging of a large area object 306.

It should be realized that the holographic optical element 308 may be formed based on desired characteristics of the illumination light and desired placement of the light sources 302, 304 in relation to the holographic optical element 308. Based on input of such desired properties of the system 300, a corresponding holographic optical element 308 may be computed using algorithms for light propagation. Thus, characteristics of the desired holographic optical element 308 may be digitally computed and may then be formed using semiconductor manufacturing technology and advanced lithography. In this manner, the holographic optical element 308 may be formed to output light through reflection or transmission and to output light of a desired shape, such as providing a focused spot or a collimated light beam.

Figure 4A:
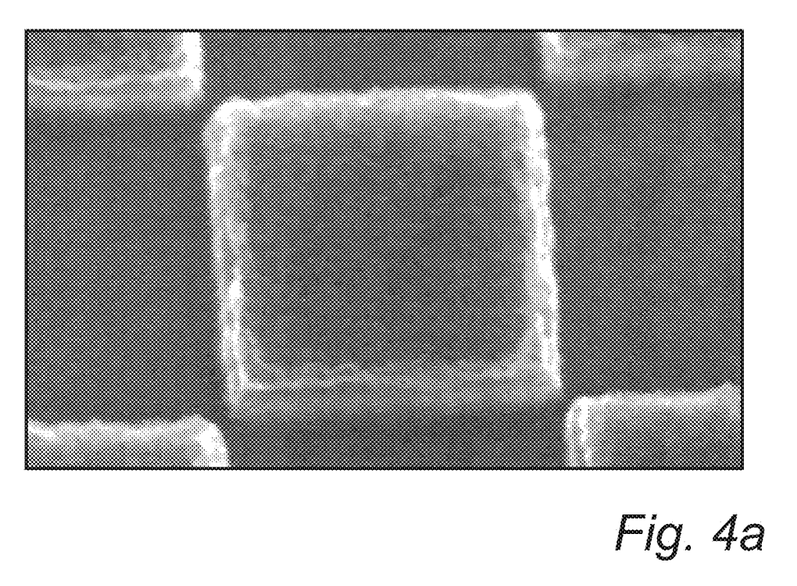
FIG. 4a is a schematic view of a magnification of a surface of a holographic optical element used in the system in FIG. 4.

FIG. 4a illustrates a magnification of a portion A of the surface of the holographic optical element 308. The holographic optical element 308 may e.g. be formed on a silicon substrate, when the holographic optical element 308 reflects light from the light sources 302, 304. The holographic optical element 208 may be formed on e.g. glass or quartz when the holographic optical element 208 transmits light from the light sources 202, 204.

Small diffractive elements 320 may be formed on the surface of the holographic optical element 308. The small diffractive elements may have sizes smaller than a wavelength of the light from the light sources. For instance, a side of a square diffractive element 320 may be smaller than the wavelength of light or a diameter of a circular diffractive element may be smaller than the wavelength of light. Such sub-wavelength diffractive elements 320 may have light-attenuating or phase-modulating characteristics. Thus, a diffractive element 320 may absorb some of an incoming photon and reduce light intensity in the position on the holographic optical element 308 where the diffractive element 320 is arranged, or the diffractive element 320 may delay or change the phase of the light e.g. by the diffractive element 320 having a higher refractive index than surrounding diffractive elements. In combination, the small diffractive elements 320 may then form the desired illumination light that is output by the holographic optical element 308.

The small diffractive elements 320 may for instance be formed as commonly shaped diffractive elements 320 which may be properly positioned on the surface in order to provide the desired illumination light. The small diffractive elements 320 could be formed as square shapes having a side of 500 nm. With light wavelengths around 635 nm, such small-sized diffractive elements 320 may allow approximately 20° angle between a propagation direction of an outputted light beam from a light source 302, 304 and a normal of the surface of the holographic optical element 308. This may allow for a compact placement of the light sources 302, 304 in relation to the holographic optical element 308 and thus a compact design of the system 100.

If the light sources 302, 304 are to be arranged to provide a wider angle in relation to the holographic optical element 308, the diffractive elements 320 need to be formed with substantially smaller sizes.

The diffractive elements 320 with a square shape may provide a binary phase-delay functionality, i.e. light is either reflected in a position on the surface with no delay (no diffractive element in the position) or it is reflected in the position with a delay of wavelength/2 (taking into account the refractive index of the diffractive element 320 used to achieve that delay).

It should be realized that other shapes of the diffractive elements 320 may be used. Also, it should be realized that the diffractive elements 320 may have different shapes in different positions on the surface.

The holographic optical element 308 may then be formed by a collection of diffractive elements 320 (of common or differing shapes) arranged in a raster that selectively modulate the light to achieve given/necessary functions to collect light from the light sources 302, 304 and output desired illumination towards the object 306.

Figure 5:
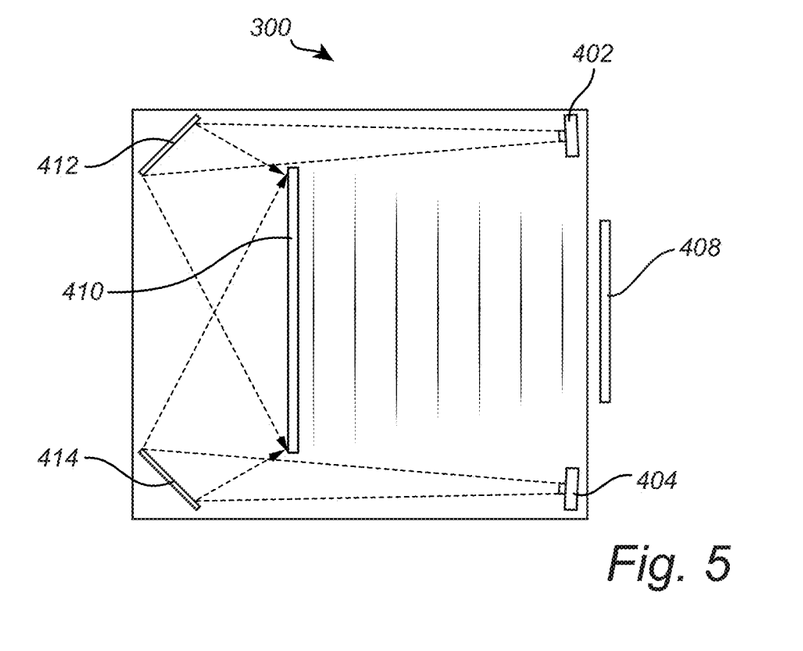
FIG. 5 is a schematic view of a system according to a fourth embodiment.

Referring now to FIG. 5, a system 400 according to a fourth embodiment of the invention will be described. In the following, differences of the system 400 according to the fourth embodiment in relation to the systems 100, 200, 300 according to the first to third embodiments are mainly discussed. As appreciated by a person skilled in the art, the system 400 of the fourth embodiment may utilize many of the features discussed above in relation to the first to third embodiments of the system 100, 200, 300.

The system 400 illustrates that more than one holographic optical element 410, 412, 414 may be used in the system 400.

Holographic optical elements 412, 414 may be associated with a single light source 402, 404 and these holographic optical elements 412, 414 which are associated with single light sources 402, 404, respectively, may interact with the light beam from the light source 402, 404 so as to form a light beam with desired characteristics to be incident on a common holographic optical element 410, which may be arranged to output a wavefront towards an object 408.

It should be realized that the holographic optical elements 412, 414 may thus for instance function to increase a numerical aperture of a light beam. This implies that the holographic optical elements 412, 414 may be arranged close to the common holographic optical element 410 and still illuminate a large area of the common holographic optical element 410. This may be very useful for providing a compact system 400 while still allowing a large-sized object 408 to be simultaneously illuminated.

As shown in FIG. 5, the holographic optical elements 412, 414 which interact with light from single light sources 402, 404 may be arranged to reflect light towards the common holographic optical element 410, while the common holographic optical element 410 may be arranged to transmit light. This allows for a very compact system 400.

However, it should be realized that other combinations of holographic optical elements may be contemplated. For instance, the number of holographic optical elements associated with a light beam may be different for light beams originating from different light sources. Also, any combination of holographic optical elements being arranged to reflect/transmit light may be contemplated.

The detected interference patterns may be processed by the processor unit 118 in order to reconstruct an optical image of the object 108 and avoiding the twin-image problem. The processor unit 118 may perform an iterative phase retrieval by simulating propagation of light waves, e.g. using a Gerchberg-Saxton algorithm.

By performing a number of iterations of the iterative phase retrieval algorithm, the twin-image noise may be removed such that a reconstructed image of high quality may be formed.

A metric may be defined for checking an improvement of image quality in every iteration of the algorithm. A user may choose a threshold indicating a minimum level of improvement with respect to a previous iteration.

Alternatively, a default or preset threshold may be used. If the metric reveals that the minimum level of improvement is not achieved in an iteration, it may be decided that an acceptable quality (in relation to required processing operations) of the reconstructed image has been achieved. Then, the iterative algorithm may be terminated and a reconstructed image may be returned.

Figure 6:
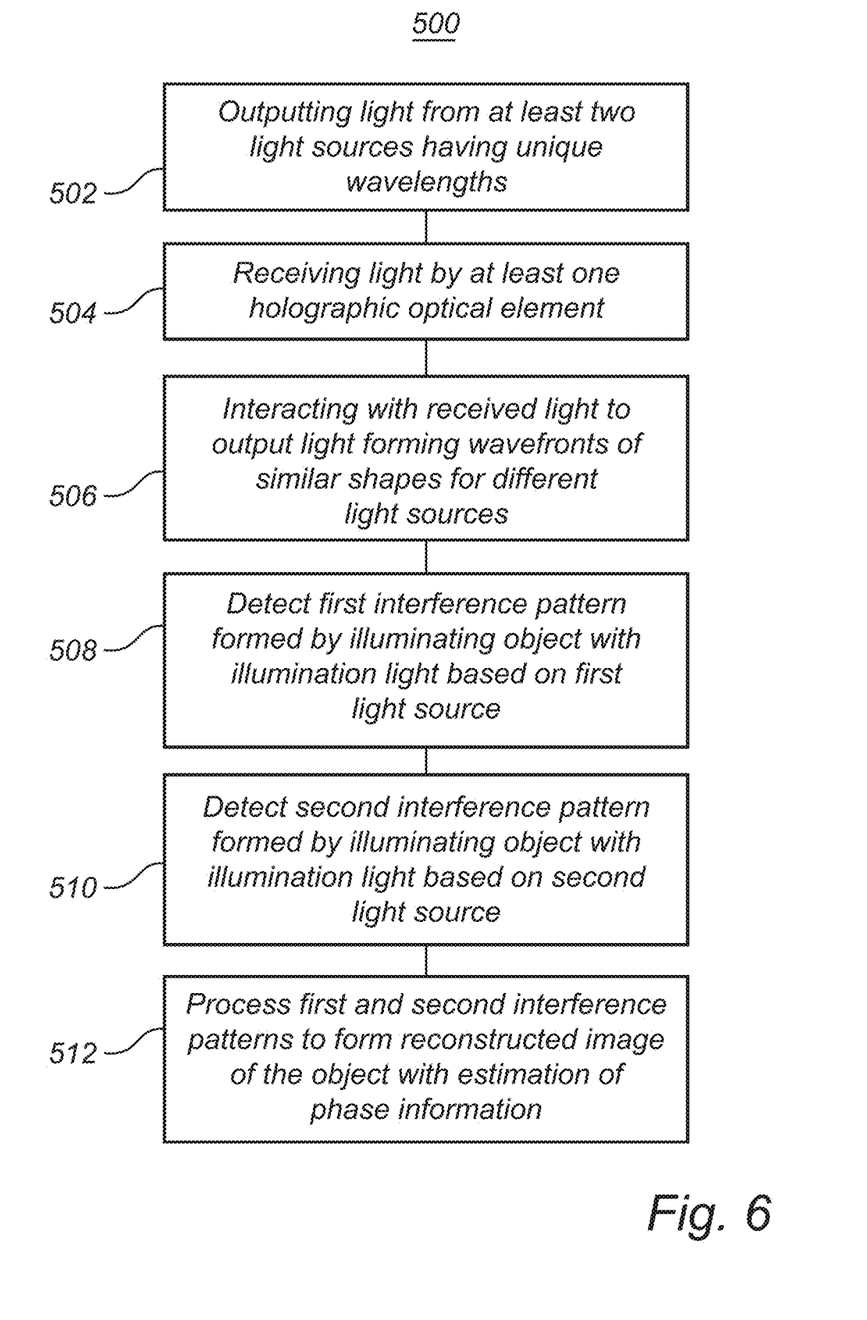
FIG. 6 is a flow chart of a method according to an embodiment.

Referring now to FIG. 6, a method 500 for in-line holographic imaging will be summarized.

The method 500 comprises outputting 502 light from at least two light sources 102, 104, 106, wherein each of the at least two light sources 102, 104, 106 outputs light of a unique wavelength.

The method further comprises receiving 504 the light from the at least two light sources 102, 104, 106 by at least one holographic optical element 110.

The method also comprises interacting 506 with the received light by the at least one holographic optical element 110 in order to output light forming wavefronts of similar shape for light originating from the different light sources 102, 104, 106.

Thus, illumination of an object for holographic imaging of the object may be provided using different wavelengths of the different sources 102, 104, 106 so that phase diversity information may be acquired in detecting interference patterns and a high quality reconstructed image of the object 108 may be formed.

The method may further comprise detecting 508 a first interference pattern formed when illuminating an object 108 by illumination light based on a light beam from the first light source 102. The method further comprises detecting 510 a second interference pattern formed when illuminating the object 108 by illumination light based on a light beam from the second light source 104. As described above, the first and second interference patterns may be simultaneously detected based on different spectral filters of the image sensor 110 or may be sequentially detected by the object 108 being sequentially illuminated based on the light beams of the first and second light sources 102, 104.

The method may further comprise processing 512 the first and second interference patterns to perform iterative phase retrieval in order to form a reconstructed image of the object with an estimation of phase information.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device in holographic imaging, said device comprising:
at least two light sources, wherein each of the at least two light sources is arranged to output light of a unique wavelength to provide a phase diversity based on the different wavelengths; and
at least one holographic optical element,
wherein the at least two light sources are disposed at different angles to with respect to a holographic optical element, the holographic optical element configured to form wavefronts of identical shape,
wherein the at least two light sources and the at least one holographic optical element are arranged in relation to each other such that light from the at least two light sources incident on the at least one holographic optical element interacts with the at least one holographic optical element to form wavefronts of identical shape, and
wherein interference patterns acquired based on light originating from each of the at least two light sources are overlapping in an image sensor.

2. The device according to claim 1, wherein the at least one holographic optical element reflects incident light towards an object and wherein the light sources and the object are arranged at the same side of the at least one holographic optical element.

3. The device according to claim 1, wherein the at least one holographic optical element transmits incident light towards an object and wherein the light sources and the object are arranged at opposite sides of the at least one holographic optical element.

4. The device according to claim 1, wherein the at least one holographic optical element comprises small diffractive elements positioned on a surface of the at least one holographic optical element such that the small diffractive elements form the wavefronts of identical shape for the incident light from different light sources.

5. The device according to claim 1, wherein the device comprises at least three light sources.

6. The device according to claim 1, wherein the distance between the light sources and the at least one holographic optical element is shorter than a size of a surface of the at least one holographic optical element on which light from the light sources is incident.

7. The device according to claim 1, further comprising a housing, wherein the light sources and the at least one holographic optical element are mounted in the housing.

8. The device according to claim 7, wherein the housing further comprises a sample receiver for holding an object in a position to receive light having interacted with the at least one holographic optical element.

9. The device according to claim 1, wherein the light sources are laser diodes.

10. A system for holographic imaging, said system comprising:
a device according to claim 1, wherein the light having interacted with the at least one holographic optical element is arranged to form illumination light for illuminating an object; and
the image sensor comprising light-detecting elements arranged to detect interference patterns formed by object light, having interacted with the object, and reference light of the illumination light, wherein one interference pattern is formed for each unique wavelength of light.

11. The system according to claim 10, further comprising a processor unit, which is arranged to receive the interference patterns from the image sensor and is arranged to reconstruct an optical image of the object based on the interference patterns.

12. The system according to claim 10, wherein the image sensor, the at least two light sources and the at least one holographic optical element are mounted in a common housing defining an optical pathway for light output from the at least one holographic optical element to the image sensor.

13. A method in holographic imaging, said method comprising:
outputting light from at least two light sources disposed at different angles to with respect to at least one holographic optical element, wherein each of the at least two light sources outputs light of a unique wavelength to provide a phase diversity based on the different wavelengths, and wherein the at least one holographic optical element is configured to form wavefronts of identical shape;
receiving the light from the at least two light sources by at least one holographic optical element; and
interacting with the received light by the at least one holographic optical element in order to output light forming wavefronts of identical shape, wherein different interference patterns acquired based on light originating from each of the at least two light sources are overlapping in an image sensor.

14. The method according to claim 13, further comprising illuminating an object using illumination light output from the at least one holographic optical element;
detecting a first interference pattern formed by object light of a first wavelength, having interacted with the object, and reference light of the illumination light of the first wavelength; and
detecting a second interference pattern formed by object light of a second wavelength, having interacted with the object, and reference light of the illumination light of the second wavelength.

15. The method according to claim 14, wherein outputting light from at least two light sources comprises sequentially outputting light from a first light source to detect the first interference pattern and outputting light from a second light source to detect the second interference pattern.

16. The device of claim 4, wherein the position of each of the small diffractive elements is determined by an algorithm.

17. The device of claim 16, wherein the algorithm determines the position of the small diffractive elements based on the position of each of the at least two light sources with respect to the at least one holographic optical element and an output light of a predetermined shape.

18. The method of claim 13, wherein the at least one holographic optical element comprises small diffractive elements positioned on a surface of the at least one holographic optical element such that the small diffractive elements form the wavefronts of identical shape for the incident light from different light sources.

19. The method of claim 18, wherein the wavefronts of identical shapes are formed by small diffractive elements positioned on a surface of the holographic optical element, and wherein a position of each of the small diffractive elements is determined by an algorithm.

20. The method of claim 19, wherein the algorithm determines the position of the small diffractive elements based on the position of each of the at least two light sources with respect to the at least one holographic optical element and an output light of a predetermined shape.

\* \* \* \* \*